United States Patent
Silverstein et al.

(10) Patent No.: US 10,726,467 B2
(45) Date of Patent: Jul. 28, 2020

(54) SMART DEVICE TRACKING OF ECOLOGICAL FOOTPRINT OF CONSUMER GOODS

(71) Applicant: International Business Machines Corporation, Armonk, NY (US)

(72) Inventors: Zachary Silverstein, Austin, TX (US); Osbel A. Rosales, Leander, TX (US); Qi Gui, Xuancheng (CN)

(73) Assignee: International Business Machinese Corporation, Armonk, NY (US)

( * ) Notice: Subject to any disclaimer, the term of this patent is extended or adjusted under 35 U.S.C. 154(b) by 178 days.

(21) Appl. No.: 16/048,525

(22) Filed: Jul. 30, 2018

(65) Prior Publication Data
US 2020/0034907 A1   Jan. 30, 2020

(51) Int. Cl.
*G06Q 30/06* (2012.01)
*G06T 7/73* (2017.01)
*G06Q 30/00* (2012.01)
*G06K 7/14* (2006.01)

(52) U.S. Cl.
CPC ....... *G06Q 30/0631* (2013.01); *G06K 7/1413* (2013.01); *G06Q 30/018* (2013.01); *G06T 7/74* (2017.01)

(58) Field of Classification Search
CPC .... G06Q 30/0631; G06Q 30/018; G06T 7/74; G06K 7/1413
USPC ...................................................... 705/26.7
See application file for complete search history.

(56) References Cited

U.S. PATENT DOCUMENTS

| | | | |
|---|---|---|---|
| 10,281,200 B2* | 5/2019 | Johnston | F25D 29/00 |
| 2012/0011773 A1* | 1/2012 | Cross | A01G 9/026 47/65.8 |
| 2016/0055422 A1 | 2/2016 | Li | |
| 2016/0162715 A1 | 6/2016 | Luk et al. | |
| 2016/0232624 A1 | 8/2016 | Goldberg et al. | |
| 2018/0187943 A1* | 7/2018 | Woo | G06Q 10/04 |

FOREIGN PATENT DOCUMENTS

WO   2014016212 A1   1/2014

OTHER PUBLICATIONS

Bonaccorsi et al. "HighChest: An Augmented Freezer Designed for Smart Food Management and Promotion of Eco-Efficient Behaviour", Sensors 2017; Jun. 2017.
Lou et al. "A Smart Fridge with an Ability to Enhance Health and Enable Better Nutrition"; IJMUE; Apr. 2009.
Hoang et al. "Fridgit", retreived from http://fmnguyen.github.io; 2015.

* cited by examiner

*Primary Examiner* — Yogesh C Garg
(74) *Attorney, Agent, or Firm* — Brown & Michaels, PC; Jay Wahlquist

(57) ABSTRACT

A food storage container, such as a smart-refrigerator, a freezer, and/or another storage space with a computer is leveraged to monitor and determine an ecological footprint associated with food being stored and consumed. Additionally, user behavior associated with the purchase and consumption efficiency of consumer goods is used to generate recommendations to reduce the ecological footprint can be generated for a user.

20 Claims, 4 Drawing Sheets

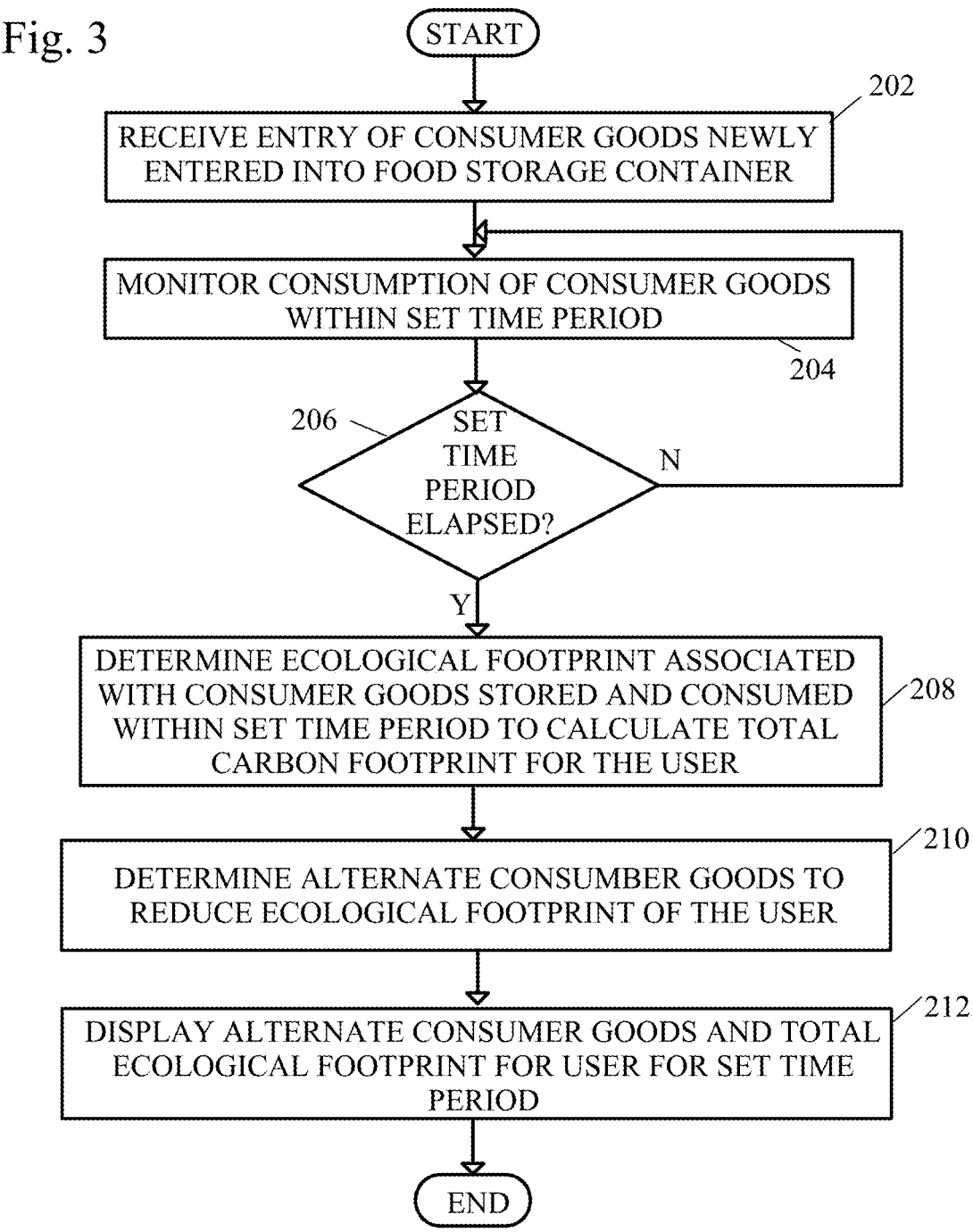

SMART DEVICE TRACKING OF ECOLOGICAL FOOTPRINT OF CONSUMER GOODS

BACKGROUND

The present invention relates to ecological food consumption, and more specifically to tracking of an ecological footprint of consumer goods using a smart food storage container, such as a refrigerator or a freezer.

People often strive to make wise purchasing decisions for the environment. Everyday groceries offer one area in which purchasing decisions can be made for an individual or family. Keeping tracking of all the decisions associated with purchasing groceries can be overwhelming, however.

An internet refrigerator (also known as a smart refrigerator) is a refrigerator that has been programmed to sense what kinds of products are stored inside, and that keeps track of its stock through barcodes or RFID scanning, manual entry etc. This kind of refrigerator is often equipped to determine whenever a food item needs to be replenished or a food item may expire and what type of food is present in the refrigerator.

SUMMARY

According to one embodiment of the present invention, a method for determining an ecological footprint of consumer goods consumed within a time period and stored within at least one food storage container is disclosed. The method includes the steps of: a computer receiving data entry of consumer goods newly entered into the at least one food storage container; the computer monitoring consumption of the consumer goods stored in the at least one food storage container for the time period; the computer determining an ecological footprint associated with the consumer goods stored and consumed within the time period after the time period has elapsed; and the computer determining alternate consumer goods to the user for reduction of the user's ecological footprint.

According to another embodiment of the present invention a computer program product for determining an ecological footprint of consumer goods consumed within a time period and stored within at least one food storage container is disclosed. The at least one food storage container includes: a computer comprising at least one processor, one or more memories, one or more computer readable storage media, the computer program product comprising a computer readable storage medium having program instructions embodied therewith, a camera, the program instructions executable by the computer to perform a method including: receiving, by the computer, data entry of consumer goods newly entered into the at least one food storage container; monitoring, by the computer, consumption of the consumer goods stored in the at least one food storage container for the time period; determining, by the computer, an ecological footprint associated with the consumer goods stored and consumed within the time period after the time period has elapsed; and determining, by the computer, alternate consumer goods to the user for reduction of the user's ecological footprint.

According to another embodiment of the present invention a computer system for determining an ecological footprint of consumer goods consumed within a time period and stored within at least one food storage container is disclosed. The at least one food storage container includes a computer including at least one processor, one or more memories, a camera, one or more computer readable storage media having program instructions executable by the computer to perform the program instructions including: receiving, by the computer, data entry of consumer goods newly entered into the at least one food storage container; monitoring, by the computer, consumption of the consumer goods stored in the at least one food storage container for the time period; determining, by the computer, an ecological footprint associated with the consumer goods stored and consumed within the time period after the time period has elapsed; and determining, by the computer, alternate consumer goods to the user for reduction of the user's ecological footprint.

According to another embodiment of the present invention, a food storage container having a storage portion for receiving and storing consumer goods is disclosed. The food storage container includes a computer comprising at least one processor, one or more memories, one or more computer readable storage media; an interface in communication with the computer for receiving data regarding at least consumer goods newly stored in the storage portion of the food storage container; and at least one sensor in the storage portion of the food storage container monitoring and providing feedback to the computer regarding consumption of the consumer goods stored in the storage portion for a time period. After the time period has elapsed, the computer, based on the consumer goods stored and consumed within the time period, determines an ecological footprint associated with the consumer goods and alternate consumer goods to the user for reduction of the user's ecological footprint.

BRIEF DESCRIPTION OF THE DRAWINGS

FIG. 3 shows a flow diagram of a method of determining an ecological footprint of consumer goods consumed within a time period.

DETAILED DESCRIPTION

In an embodiment of the present invention, a food storage container, such as a smart-refrigerator, a freezer, and another type of storage space with a computer is leveraged to monitor and determine an ecological footprint associated with food stored and consumed. Additionally, user behavior associated with the purchase of consumer goods is used to generate recommendations for a user to reduce the ecological footprint.

Figure 1:
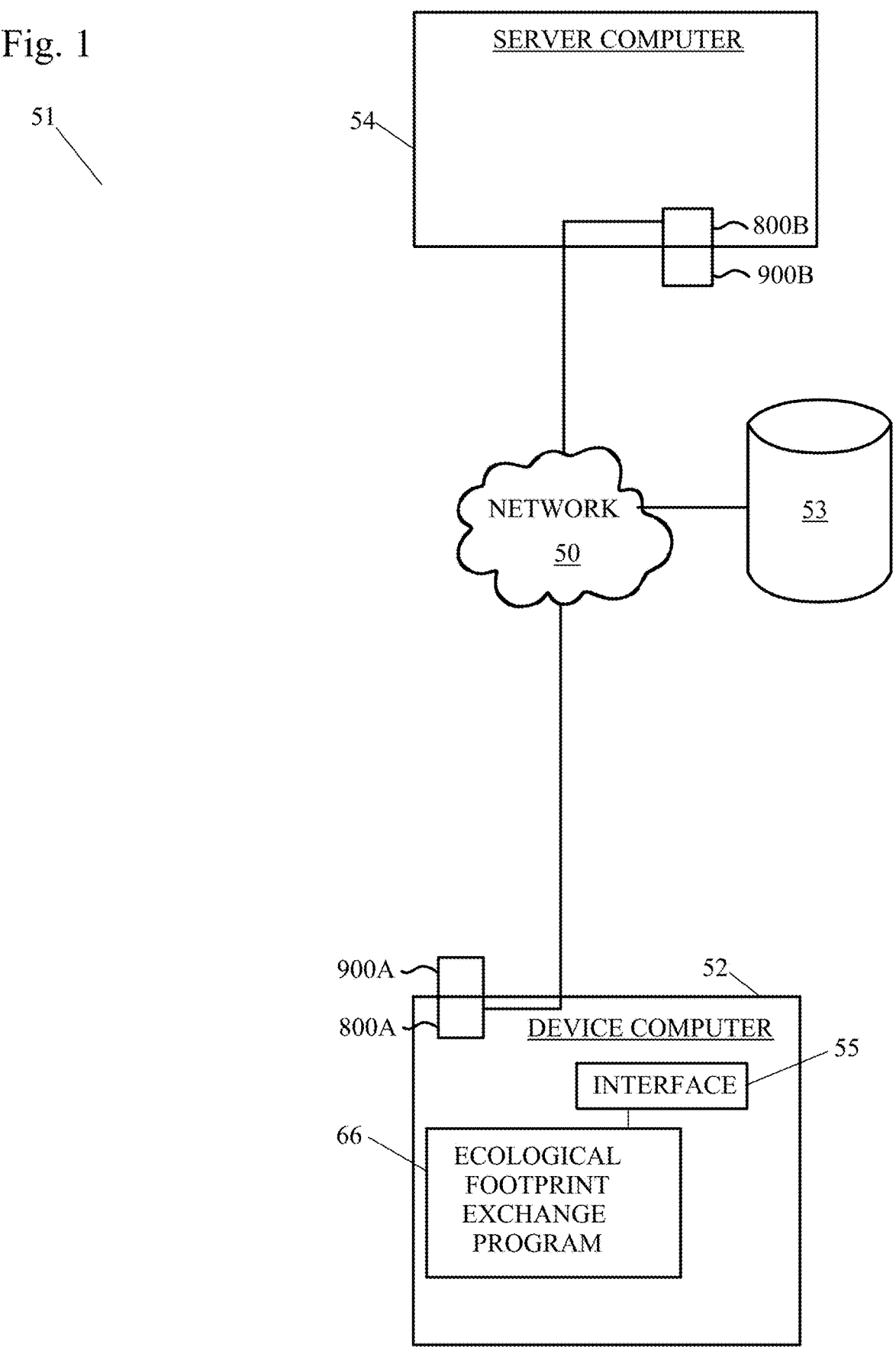
FIG. 1 depicts an exemplary diagram of a possible data processing environment in which illustrative embodiments may be implemented.

FIG. 1 is an exemplary diagram of a possible data processing environment in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as connections by wire, wireless communication links, or fiber optic cables.

In the depicted example, a device computer 52, a repository 53, and a server computer 54 connect to network 50. In other exemplary embodiments, network data processing system 51 may include additional client or device computers, storage devices or repositories, server computers, and other devices not shown.

Figure 4A:
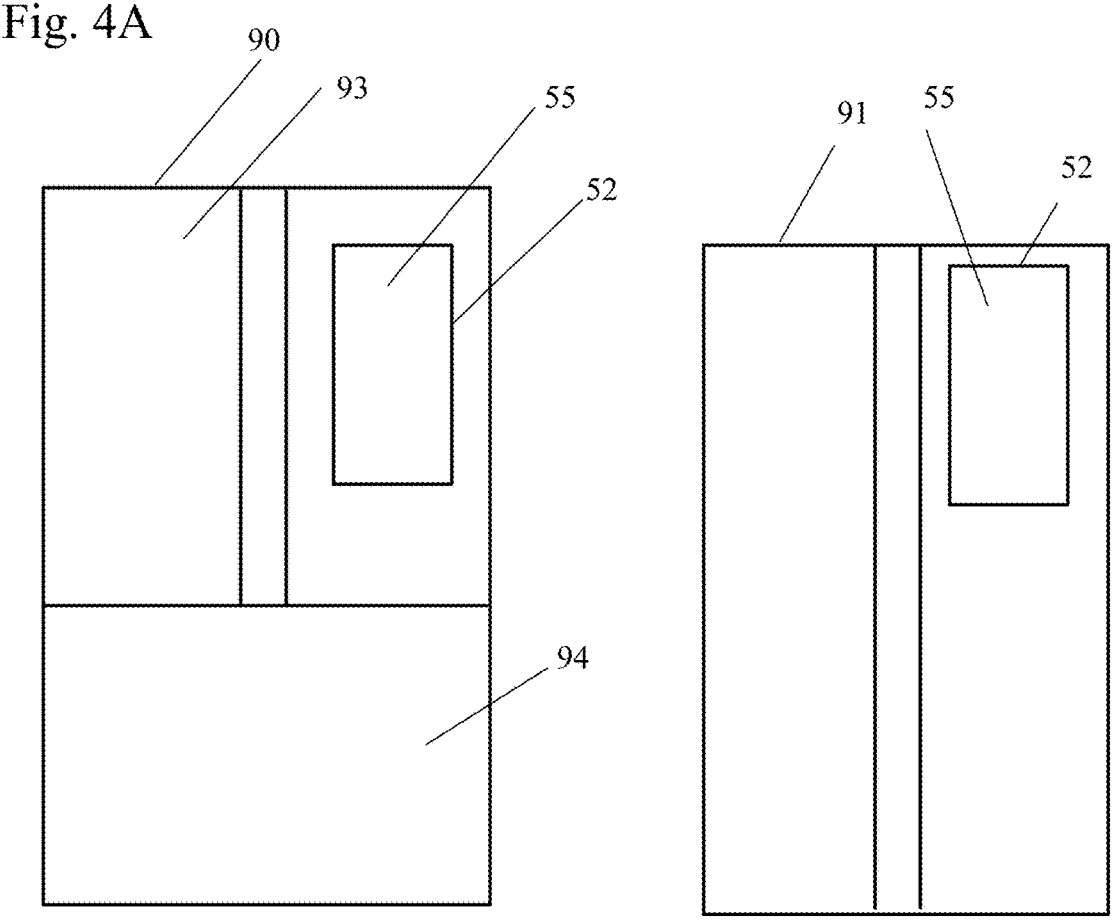
FIGS. 4A and 4B show a schematic of food storage containers in an open and closed position.
Figure 4B:
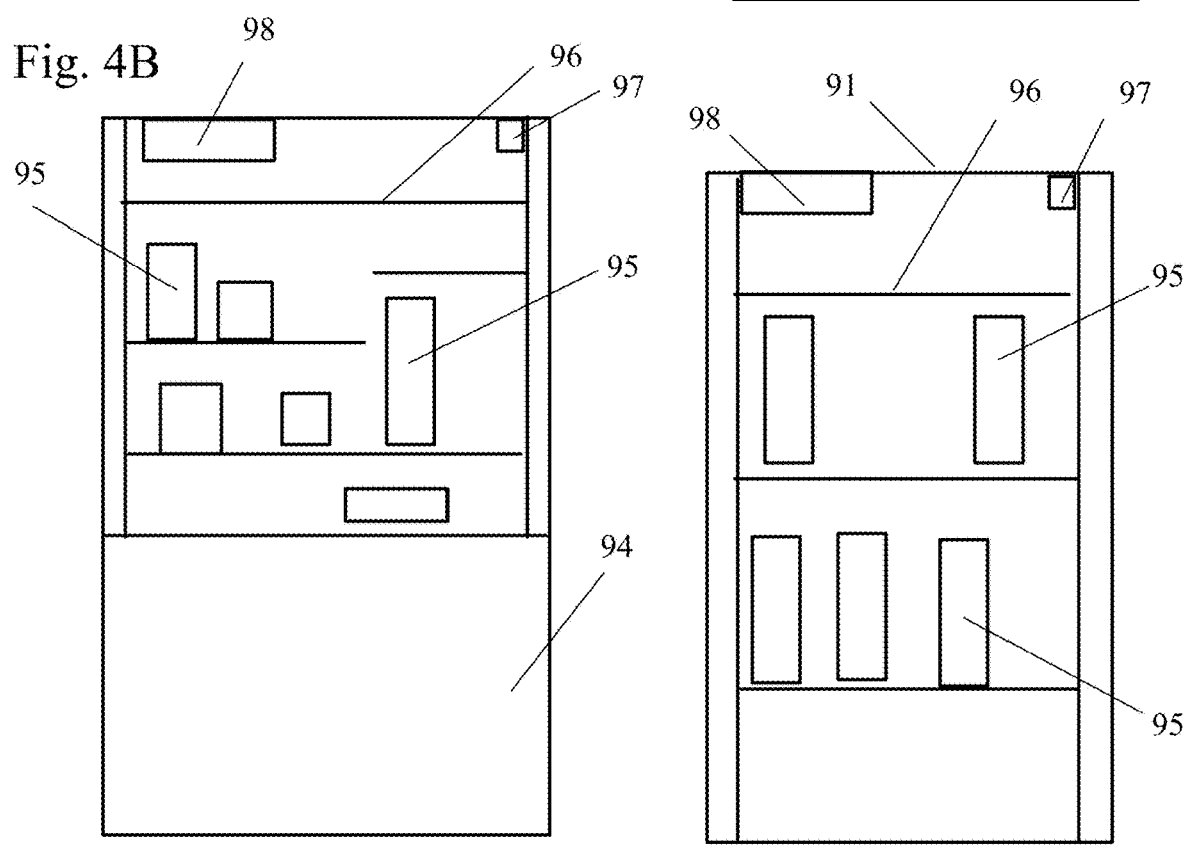

The device computer 52 is preferably in communication with or within a food storage container such as a smart refrigerator and/or freezer 90. In another embodiment, the food storage container need not be a refrigerator and/or freezer, but any container to store consumer goods, such as a pantry 91. An example of the food storage container as refrigerator/freezer and a pantry is shown in FIGS. 4A and 4B. The refrigerator/freezer 90 has a refrigerator section 93 and a freezer section 94. Within both sections 93, 94 shelving 96 may be present in which consumer goods 95 are stored. A pantry 91 additionally has shelving 96 for storing consumer goods 95. The device computer 52 may contain an interface 55 which may accept commands and data entry from a user. The commands may be regarding setting an ecological footprint goal and food and other consumer goods 95 stored in the food storage container 90, 91. While not shown, the pantry may additional have a device computer 52 and a corresponding interface 55. The food storage container 90, 91 may have sensors 97 which monitor and provide feedback to the device computer 52 to provide data regarding the consumer goods being stored and consumed through entry and exit from the food storage container 90, 91. The device computer 52 may provide input regarding consumer goods 95 being stored. The data may be received through different methods, such as RFID scanning, manual entry from a user through the interface 55, data captured through a camera 98 present within the food storage container 90, 91 visually measuring the food after entry and exit of the consumer goods 95 from the food storage container 90, 91, or a combination of these or other methods.

The interface of the device computer may also be used to display a current ecological footprint, suggestions for reducing the ecological footprint, image captures showing consumption of the consumer goods, and recipes using the suggested consumer products or foods to reduce the ecological footprint.

The interface 55 can be, for example, a command line interface, a graphical user interface (GUI), a natural user interface (NUI), or a touch user interface (TUI). The device computer 52 preferably includes an ecological footprint exchange program 66. While not shown, it may be desirable to have the ecological footprint exchange program 66 present on the server computer 54. The device computer 52 includes a set of internal components 800a and a set of external components 900a, further illustrated in FIG. 2.

Figure 2:
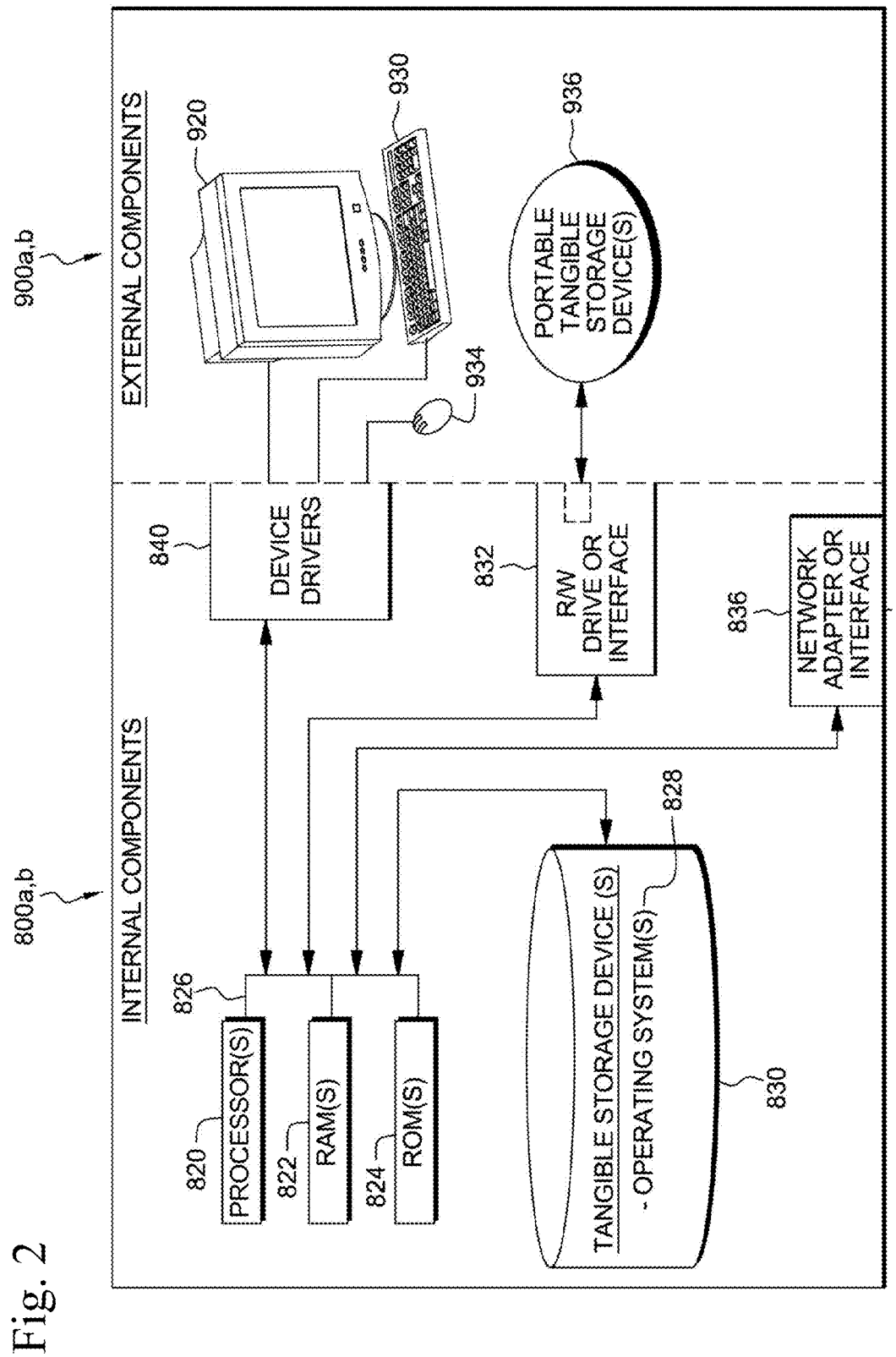
FIG. 2 depicts an exemplary diagram of a possible data processing environment in which illustrative embodiments may be implemented.

Server computer 54 includes a set of internal components 800b and a set of external components 900b illustrated in FIG. 2. In the depicted example, server computer 54 provides information, such as boot files, operating system images, and applications to the device computer 52. Server computer 54 can compute the information locally or extract the information from other computers on network 50. The server computer 54 may also contain the ecological footprint exchange program 66.

It should be noted that while only a single device computer 52 is shown, multiple device computers may be present and networked together.

Program code and programs such as the ecological footprint exchange program 66 may be stored on at least one of one or more computer-readable tangible storage devices 830 shown in FIG. 2, stored on at least one of one or more portable computer-readable tangible storage devices 936 as shown in FIG. 2, stored on storage unit 53 connected to network 50, or downloaded to a device computer 52 or server computer 54, for use. For example, program code and programs such as the ecological footprint exchange program 66 may be stored on at least one of one or more storage devices 830 on server computer 54 and downloaded to the device computer 52 over network 50 for use. Alternatively, server computer 54 can be a web server, and the program code, and programs such as the ecological footprint exchange program 66 may be stored on at least one of the one or more storage devices 830 on server computer 54 and accessed by the device computer 52. In other exemplary embodiments, the program code, and programs such as the ecological footprint exchange program 66 may be stored on at least one of one or more computer-readable storage devices 830 on device computer 52 or distributed between two or more servers.

In the depicted example, network data processing system 51 includes the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

FIG. 2 illustrates internal and external components of a device computer 52 and server computer 54 in which illustrative embodiments may be implemented. In FIG. 2, a device computer 52 and a server computer 54 include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and ecological footprint exchange program 66 are stored on one or more of the computer-readable tangible storage devices 830 for execution by one or more of the processors 820 via one or more of the RAMs 822 (which typically include cache memory). In the embodiment illustrated in FIG. 2, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Ecological footprint exchange program 66 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Ecological footprint exchange program 66 can be downloaded to the device computer 52 and server computer 54 from an external computer via a network (for example, the Internet, a local area network or other, wide area network) and network adapter or interface 836. From the network adapter or interface 836, ecological footprint program 66 is loaded into hard drive 830. Ecological footprint exchange program 66 can be downloaded to the server computer 54 from an external computer via a network (for example, the Internet, a local area network or other, wide area network) and network adapter or interface 836. From the network adapter or interface 836, ecological footprint exchange program 66 is loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Ecological footprint exchange program 66 can be written in various programming languages including low-level, high-level, object-oriented, or non object-oriented languages. Alternatively, the functions of an ecological footprint exchange program 66 can be implemented in whole or in part by computer circuits and other hardware (not shown).

FIG. 3 shows a flow diagram of a method of determining an ecological footprint of consumer goods consumed within a time period.

Prior to the method of determining an ecological footprint of consumer goods, the ecological footprint exchange program 66 can receive goals from the user regarding reducing their ecological footprint (e.g. reducing my ecological footprint by 25%). These goals can also be detected through monitoring. For example, the user is historically on target for having an ecological footprint of a first value, but another week is at double the value.

In a first step, the ecological footprint exchange program 66 of the device computer 52 receives entry of consumer goods 95 newly entered into the food storage container 90, 91 (step 202) and stores the consumer goods within a repository, for example repository 53. The entry of consumer goods 95 newly entering the food storage container 90, 91 may be provided through scanning of barcodes present on packaging of the consumer goods, RFID tags within the packaging of the consumer goods 95, manual entry, and through image scan or identification of products by object identification via images captured by a camera 98 integral to the food storage container 90, 91. The information provided as part of entry of consumer foods 95 newly entered into the food storage container 90, 91 may contain, but is not limited to type of consumer good, weight of the consumer good, whether or how much the consumer good is detrimental to the environment, detection of packaging type (e.g. plastic, glass) and whether the consumer good was organic.

In another embodiment, additional consumer goods which are newly purchased may also be entered into the ecological footprint exchange program 66, but not necessarily stored in the food storage container, such as beans, lentils, etc. Instead, these additional consumer goods would be stored in a pantry. The pantry may or may not contain device computer 52. The consumption of these consumer goods can be manually scanned by a user within the set time period.

The ecological footprint exchange program 66 monitors the consumer goods 95 stored in the food storage container 90, 91 to determine the amount of goods consumed within a set time period (step 204) and stores the amount of goods consumed within a repository, for example repository 53. The amount of goods 95 consumed can be determined by sensors 97 present within the food storage container 90, 91 measuring weight at an interval, or by a camera 98 capturing an image of the consumer good after entry and exit of the consumer goods (e.g. determined through opening and closing of doors of a food storage container) from the food storage container 90, 91 which are compared to determine a quantity of the consumer goods 95 consumed. The set time period can be set by the user or can be set automatically. The interval can also be set or altered by the user.

In one embodiment, food consumption can be captured to recommend an amount to purchase which is completely consumed versus partially consumed. For example, a kilogram of a consumer good is purchased and entered into the food storage container with half of the consumer good consumed prior to the expiration date. The ecological footprint exchange program 65 can recommend purchasing only 0.5 kg to reduce the ecological footprint of the use based on the tracking.

If the set time period has not elapsed (step 206), the method returns to step 202.

If the set time period has elapsed (step 206), the ecological footprint exchange program 66 determines the ecological footprint associated with the consumer goods 95 stored and consumed within the set time period to calculate a total carbon dioxide emissions representative of the set time period for the user (step 208). The ecological footprint of consumer goods is calculated as the greenhouse gas or carbon dioxide ($CO_2$) emissions produced by growing, rearing, farming, processing transporting storing, cooking and disposing of food eaten by a user. The data may be stored in a/the database, which can be present within the repository, for example repository 53, or which can be accessible through the Internet.

For example, if a user, over a set time period of a week consumes 2 kg of lamb and consumes all of the lamb, the ecological footprint exchange program can determine that the emissions in Kg of $CO_2$ present per 1 kilogram of lamb is 39.2, and therefore, that the user's ecological footprint relative to the lamb consumed is 78.4 Kg of $CO_2$.

The ecological footprint exchange program 66 determines alternate consumer goods to reduce the ecological footprint of the user (step 210). The ecological footprint exchange program 66 can determine alternate consumer goods 95 by learning user behavior and detecting trends regarding consumer goods 95 regularly purchased and consumed to completion by the user within the set time period or regarding consumer goods 95 which are similar to goods which are regularly purchased by the user.

Alternate consumer goods can be determined in a number of ways. In a first embodiment, alternate consumer goods may be determined through web scraping and integration with recipes. For example, a user uses their food storage container to select recipes for grilled tuna one a month.

During one week, the user eats tuna five times. The ecological footprint exchange program 66 of the food storage container determines that a large ecological footprint is associated with tuna and the amount of tuna the user consumed. The ecological footprint exchange program 66 searches for similar recipes. For example searching for a recipe including the word "Grilled" and a similar protein, which results in a recipe for "Grilled Salmon". Other examples may be searching for "salad" to replace "tuna salad" with "chicken salad", searching for cake to replace "salmon cakes" with "lobster cakes."

In another embodiment, item semantic classification can be used. Consumer goods can be classified into whether the item is a protein, bread or grain, dairy, produce, or vegetable. Additional classification can determine whether the protein is meat, poultry, seafood or plant based. For example, Fuji apples received by the food storage container may include data regarding where the apples came from, such as being imported from another country versus local sourcing. A smaller ecological footprint is generated from purchasing consumer goods locally as opposed to importing. The ecological footprint exchange program 66 can provide suggestions regarding a specific semantic category such as produce or apple and provide alternative consumer goods.

Using the same example of the lamb, the ecological footprint exchange program 66 can determine that the user in previous weeks used and consumed chicken. Because chicken has a lower ecological footprint, the ecological footprint exchange program 66 recommends replacing all the lamb being consumed by the user with chicken, or a portion of the lamb being consumed with chicken, and may also provide information regarding how the ecological footprint is affected. In this example, if the user were to replace half the lamb consumed in a month with chicken, which has an ecological footprint of 6.9 kg of $CO_2$ (7.5 times less carbon emissions than lamb), 200 kg of $CO_2$ emissions would be prevented. A recipe that includes additional consumer goods present within the food storage container could be suggested, such as chicken with lentils. In another embodiment, the overall estimated carbon emissions can be displayed if the change were to be made wholly from lamb to chicken, partially from lamb to chicken or no changes.

Next, the ecological footprint exchange program 66 displays alternate consumer goods and a total ecological footprint for a current set time period (step 212), and the method ends. The display can additionally include recipe suggestions with the alternate consumer goods and track ecological footprint of the user through multiple set time periods.

In an example, the food storage container reads barcodes of packages being entered into the food storage container. The food storage container stores entries of 2 kg of farm raised salmon, 1 kg of ground beef and 1 kg of tomatoes. The food storage container additionally receives a manual entry of 1 kg pine nuts. Through the ecological footprint exchange program 66, consumption of the consumer goods is monitored as being consumed within a week. The user used all of the ground beef and salmon, but only half of the tomatoes and half of the pine nuts. Once the week has elapsed from when the consumer goods were received by the food storage container, the ecological footprint exchange program 66 determines the ecological footprint associated with the goods consumed. In this case, consumption would be as shown in Table 1:

TABLE 1

| Consumer Good | Amount received | Amount Consumed | $CO_2$ emissions per kg | $CO_2$ emissions per kg within set time period |
|---|---|---|---|---|
| Ground Beef | 1 kg | 1 kg | 27.0 | 27.0 |
| Farm Raised Salmon | 2 kg | 2 kg | 11.9 | 23.8 |
| Tomatoes | 1 kg | 0.5 kg | 1.1 | 0.55 |
| Pine Nuts | 1 kg | 0.5 kg | 2.3 | 1.15 |
| | Total | | | 52.5 |

Alternative recommendations for consumer goods which would reduce the ecological footprint of the user may be based on multiple weeks or months. The ecological footprint exchange program 66 over months can learn the user's behavior, including likes and dislikes as well as other information, and would suggest that if the ground beef was switched to ground turkey, the ecological footprint of the user would be decreased by about half or 386.6 kg of $CO_2$ emissions over a six month period. Recipes using ground turkey and tomatoes, such as chili may also be suggested and displayed to the user.

In this example, the user could have goals such as "reduce footprint by 25%". The ecological footprint exchange program 66 can detect whether a pattern has changed. that based on what is currently occurring The present invention uses a new technique to analyze an ecological footprint of a user based on the actual amount of consumer goods consumed. The present invention additionally generates new data in providing a recommendation or alternative consumer goods in reducing the user's ecological footprint, as well as an associated recipe recommendation.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for determining an ecological footprint of consumer goods consumed within a time period and stored within at least one food storage container comprising the steps of:
   a computer receiving data entry of consumer goods newly entered into the at least one food storage container;
   the computer monitoring consumption of the consumer goods stored in the at least one food storage container for the time period;
   the computer determining an ecological footprint associated with the consumer goods stored and consumed within the time period after the time period has elapsed; and
   the computer determining alternate consumer goods to the user for reduction of the user's ecological footprint.

2. The method of claim 1, wherein the data entry of consumer goods is received through scanning of an image of or associated with the consumer goods.

3. The method of claim 2, wherein the image is a barcode associated with the consumer good.

4. The method of claim 2, wherein the image is a captured image of the consumer goods present within the good storage container and the consumer good is identified through the captured image.

5. The method of claim 1, wherein data received from the data entry of the consumer goods is selected from the group consisting of: type of consumer good, weight of the consumer good, effect of the consumer good on the environment, and organically grown.

6. The method of claim 1, wherein the consumption of the consumer goods stored in the food storage container is sensed by a sensor measuring weight of the consumer good at an interval within the time period.

7. The method of claim 1, wherein the consumption of the consumer goods stored in the food storage container is sensed by determining a difference between captured images of the consumer goods within the at least one food storage container.

8. The method of claim 1, wherein the ecological footprint comprises a total carbon dioxide emissions for all consumer goods stored and consumed within the time period.

9. The method of claim 1, wherein the alternate consumer goods are determined by detecting trends of consumer goods purchased and consumed by the user which are similar to other consumer goods purchased by the user.

10. The method of claim 1, further comprising displaying the alternate consumer goods and a total ecological footprint of the user for the time period.

11. The method of claim 10, further comprising displaying recipe suggestions including the alternate consumer goods.

12. The method of claim 10, further comprising displaying a total ecological footprint of the user over multiple time periods.

13. A computer program product for determining an ecological footprint of consumer goods consumed within a time period and stored within at least one food storage container, the at least one food storage container comprising: a computer comprising at least one processor, one or more memories, one or more computer readable storage media, the computer program product comprising a computer readable storage medium having program instructions embodied therewith, a camera, the program instructions executable by the computer to perform a method comprising:
- receiving, by the computer, data entry of consumer goods newly entered into the at least one food storage container;
- monitoring, by the computer, consumption of the consumer goods stored in the at least one food storage container for the time period;
- determining, by the computer, an ecological footprint associated with the consumer goods stored and consumed within the time period after the time period has elapsed; and
- determining, by the computer, alternate consumer goods to the user for reduction of the user's ecological footprint.

14. The computer program product of claim 13, wherein the alternate consumer goods are determined by detecting trends of consumer goods purchased and consumed by the user which are similar to other consumer goods purchased by the user.

15. The computer program product of claim 13, further comprising displaying the alternate consumer goods and a total ecological footprint of the user for the time period.

16. The computer program product of claim 15, further comprising displaying a total ecological footprint of the user over multiple time periods.

17. A food storage container having a storage portion for receiving and storing consumer goods, the food storage container comprising:
- a computer comprising at least one processor, one or more memories, one or more computer readable storage media;
- an interface in communication with the computer for receiving data regarding at least consumer goods newly stored in the storage portion of the food storage container; and
- at least one sensor in the storage portion of the food storage container monitoring and providing feedback to the computer regarding consumption of the consumer goods stored in the storage portion for a time period;
- wherein after the time period has elapsed, the computer, based on the consumer goods stored and consumed within the time period, determining an ecological footprint associated with the consumer goods and alternate consumer goods to the user for reduction of the user's ecological footprint.

18. The food storage container of claim 17, further comprising a camera in the storage portion and in communication with the computer capturing images of the consumer goods within the time period.

19. The food storage container of claim 17, wherein the interface displays the alternate consumer goods and a total ecological footprint of the user for the time period.

20. The food storage container of claim 17, wherein the alternate consumer goods are determined by the computer detecting trends of consumer goods purchased and consumed by the user from the storage portion of the food storage container which are similar to other consumer goods purchased by the user.

* * * * *